US012779435B2

(12) United States Patent
Kakinuma et al.

(10) Patent No.: US 12,779,435 B2
(45) Date of Patent: Nov. 3, 2026

(54) SUPPORTED METAL CATALYST

(71) Applicant: UNIVERSITY OF YAMANASHI, Kofu (JP)

(72) Inventors: Katsuyoshi Kakinuma, Kofu (JP); Makoto Uchida, Kofu (JP); Akihiro Iiyama, Kofu (JP)

(73) Assignee: UNIVERSITY OF YAMANASHI, Yamanashi (JP)

( * ) Notice: Subject to any disclaimer, the term of this patent is extended or adjusted under 35 U.S.C. 154(b) by 761 days.

(21) Appl. No.: 18/042,531

(22) PCT Filed: Aug. 20, 2021

(86) PCT No.: PCT/JP2021/030602
§ 371 (c)(1),
(2) Date: Feb. 22, 2023

(87) PCT Pub. No.: WO2022/045004
PCT Pub. Date: Mar. 3, 2022

(65) Prior Publication Data

US 2023/0321633 A1 Oct. 12, 2023

(30) Foreign Application Priority Data

Aug. 25, 2020 (JP) ................................ 2020-142118

(51) Int. Cl.
*B01J 23/14* (2006.01)
*B01J 23/42* (2006.01)
(Continued)

(52) U.S. Cl.
CPC ............... *B01J 23/14* (2013.01); *B01J 23/42* (2013.01); *B01J 35/33* (2024.01); *B01J 35/45* (2024.01);
(Continued)

(58) Field of Classification Search
None
See application file for complete search history.

(56) References Cited

U.S. PATENT DOCUMENTS

2007/0244003 A1 10/2007 Majima et al.
2010/0184586 A1 7/2010 Majima et al.
(Continued)

FOREIGN PATENT DOCUMENTS

CN 1968746 A 5/2007
CN 109219901 A 1/2019
(Continued)

OTHER PUBLICATIONS

Machine Translation, JP-2007115637-A, Tsuji Yoichiro, May 10, 2007 (Year: 2007).*
(Continued)

*Primary Examiner* — Colin W. Slifka
(74) *Attorney, Agent, or Firm* — Maier & Maier, PLLC

(57) ABSTRACT

A supported metal catalyst in which an electric conductivity is enhanced. The supported metal catalyst includes a support powder; and metal fine particles supported by the support powder. The support powder is an aggregate of support fine particles; the support fine particles are provided with a chained portion structured by a plurality of crystallites being fusion-bonded to form a chain; the support fine particles are structured with a metal oxide; and the supported amount of metal fine particles per unit area of the surface area of the support powder calculated based on sphere approximation is 3.4 to 13.7 ($mg/m^2$).

20 Claims, 13 Drawing Sheets

(51) Int. Cl.

| | |
|---|---|
| ***B01J 35/33*** | (2024.01) |
| ***B01J 35/45*** | (2024.01) |
| ***B01J 35/61*** | (2024.01) |
| ***B01J 35/70*** | (2024.01) |
| ***B01J 35/77*** | (2024.01) |

(52) U.S. Cl.

CPC ............. *B01J 35/613* (2024.01); *B01J 35/70* (2024.01); *B01J 35/77* (2024.01); *B01J 2235/00* (2024.01); *B01J 2235/15* (2024.01); *B01J 2235/30* (2024.01)

(56) References Cited

U.S. PATENT DOCUMENTS

| | | | |
|---|---|---|---|
| 2010/0233574 A1 | 9/2010 | Masao et al. | |
| 2012/0295184 A1 | 11/2012 | Watanabe et al. | |
| 2017/0326532 A1 | 11/2017 | Lee et al. | |
| 2019/0157688 A1 | 5/2019 | Senoo et al. | |
| 2020/0164349 A1 | 5/2020 | Kakinuma et al. | |
| 2021/0339224 A1 | 11/2021 | Arata et al. | |

FOREIGN PATENT DOCUMENTS

| | | | |
|---|---|---|---|
| JP | 2007115637 A * | 5/2007 | |
| JP | 2019-111510 A | 7/2019 | |
| WO | 2011/065471 A1 | 6/2011 | |
| WO | 2015/050046 A1 | 4/2015 | |
| WO | 2016084762 A1 | 6/2016 | |
| WO | 2019/021904 A1 | 1/2019 | |
| WO | 2020/080400 A1 | 4/2020 | |

OTHER PUBLICATIONS

Wang et al. "Recent developments in Pt—Co catalysts for proton-exchange membrane fuel cells", Current Opinion in Electrochemistry 2021, 28:100715 (Year: 2021).*

International Search Report issued on Oct. 26, 2021 in corresponding application No. PCT/JP2021/030602; 9 pgs.

Takahashi Kento et al., "Improvement of Cell Performance in Low-Pt-Loading PEFC Cathode Catalyst Layers with Pt/Ta—SnO2 Prepared by the Electrospray Method", Journal of the Electrochemical Society, Jan. 27, 2017, vol. 164, Nr:4, pp. F235-F242; 8 pgs.

Extended Search Report issued on Feb. 7, 2024, in corresponding European Application No. 21861431.1, 8 pages.

Senoo et al., "Improvements in Electrical and Electrochemical Properties of Nb-doped Sn02-δ Supports for Fuel Cell Cathodes Due to Aggregation and Pt Loading", RSC Advances, The Royal Society of Chemistry, Jan. 1, 2014, vol. 4, No. 61, 9 pages.

Office Action issued on Jul. 22, 2025, in corresponding Japanese Application No. 2022-544547, 6 pages.

Office Action issued on Jun. 24, 2025, in corresponding Chinese Application No. 202180052770.9, 23 pages.

Bing et al., "Investigation of PEM Fuel Cell Based on Non-Platinum Catalysts", Tongji Dissertation Series, Tongji University Press, ISBN: 978-7-5608-6946-9, Aug. 2017, 5 pages.

Office Action issued on Jun. 24, 2024, in corresponding Chinese Application No. 202180052770.9, 23 pages.

* cited by examiner

130

130

SUPPORTED METAL CATALYST

TECHNICAL FIELD

The present invention relates to a supported metal catalyst.

BACKGROUND

Patent Literature 1 discloses a supported metal catalyst obtained by supporting platinum on Nb—$SnO_2$ produced by a flame method.

Patent Literature

[Patent Literature 1] WO2015/050046

SUMMARY

Table 1 in Patent Literature 1 discloses Examples and Comparative Examples in which a supported amount of platinum is 3 to 16.3 mass %. An electric conductivity after supporting platinum increases as the supported amount of platinum increases up to 13 mass %, but the electric conductivity hardly changes even if the supported amount of platinum is further increased. For this reason, it is considered difficult to increase the electric conductivity of the supported metal catalyst by increasing the supported amount of Pt, and the supported amount of platinum was usually set at approximately 16 mass %.

The present invention has been made by taking these circumstances into consideration. The present invention provides a supported metal catalyst with an enhanced electric conductivity.

According to the present invention, provided is a supported metal catalyst comprising: a support powder; and metal fine particles supported on the support powder; wherein: the support powder is an aggregate of support fine particles; the support fine particles have a chained portion structured by a plurality of crystallites being fusion-bonded to form a chain; the support fine particles are structured with a metal oxide; and a supported amount of the metal fine particles per unit area of a surface area of the support powder calculated based on spherical approximation is 3.4 to 13.7 ($mg/m^2$).

The present inventors have conducted intensive research, and have found that when the supported amount of metal fine particles exceeds a certain threshold, adjacent metal particles are partially fusion-bonded to each other to form a wire-shaped continuum, and this continuum becomes a conductive pathway increasing an electric conductivity, thereby leading to completion of the invention.

DETAILED DESCRIPTION

Hereinafter, embodiments of the present invention will be explained with reference to the drawings. Various distinctive features shown in the following embodiments can be combined with each other. In addition, an invention can be established independently for each of the distinctive features.

1. Supported Metal Catalyst 100

As shown in FIGS. 1 to 4, the supported metal catalyst 100 comprises a support powder which is an aggregate of support fine particles 150 having a chained portion structured by fusion-bonding a plurality of crystallites 120 into a chain, and metal fine particles 130 supported on the support powder. Hereinafter, each constitution will be explained.

1-1. Support Fine Particles 150 and Support Powder

Figure 1:
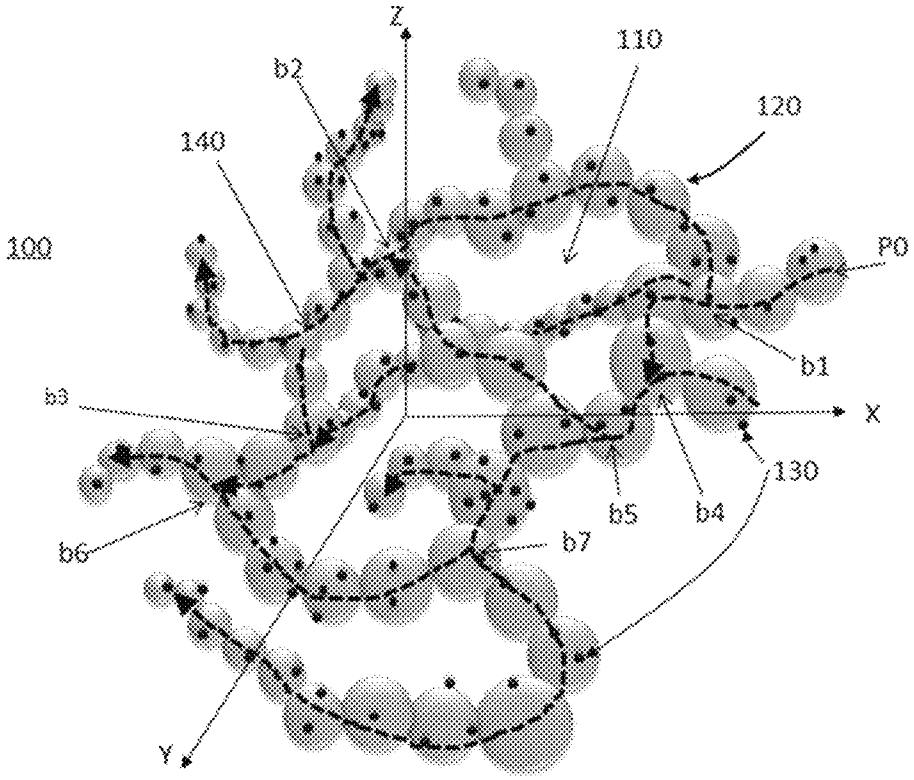
FIG. 1 shows a model diagram of a catalyst structure of a supported metal catalyst 100.
Figure 2:
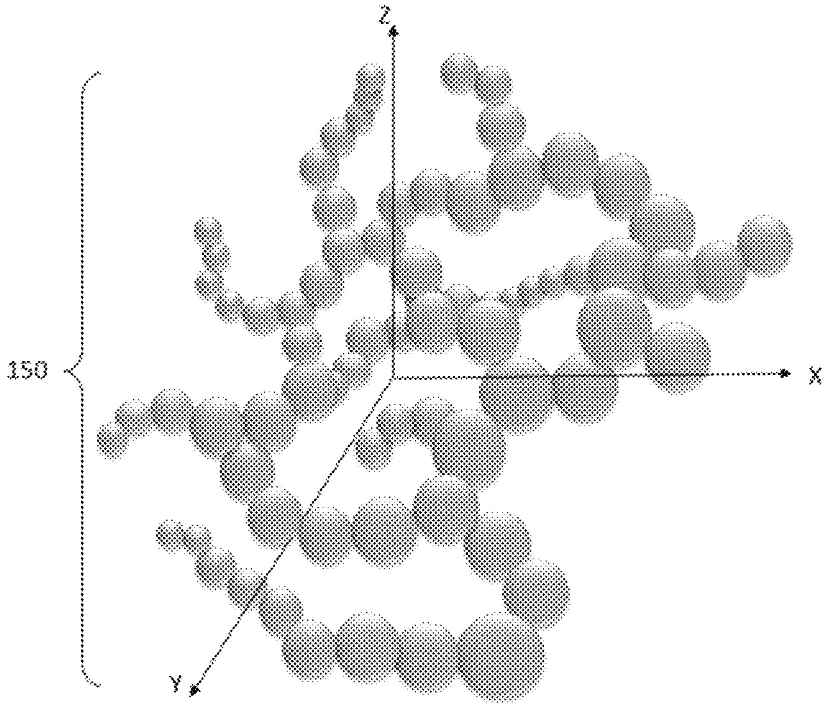
FIG. 2 shows a view in which support fine particles 150 are taken from FIG. 1.
Figure 3:
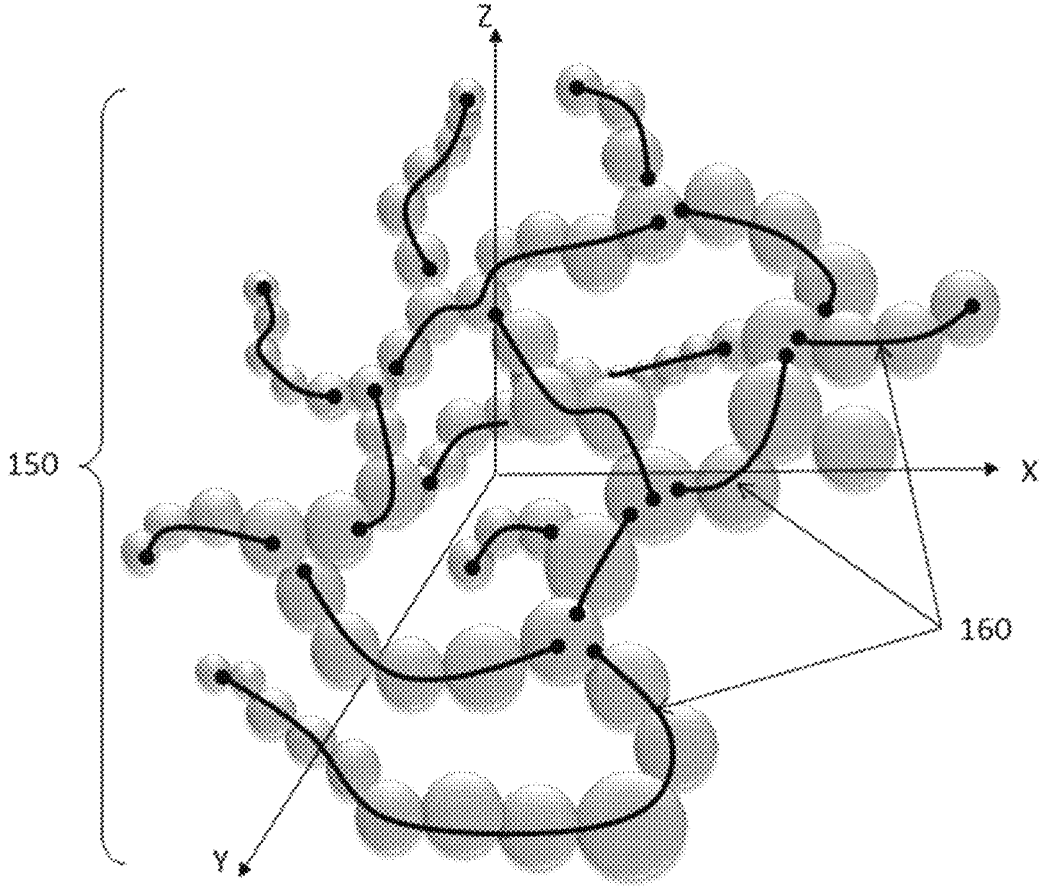
FIG. 3 shows a condition of a branch 160 of the support fine particles 150 of FIG. 1.

As shown in FIGS. 1 to 3, in the support fine particles 150, a three-dimensional void 110 surrounded by a branch 160 and pores existing between a plurality of branches is formed. Here, a plurality of crystallites 120 structuring the support fine particles 150 is fusion-bonded to form a chained portion, thereby forming the branch 160. A gas diffusion route to diffuse and transfer oxygen as an oxidant and/or hydrogen as a fuel to the supported metal catalyst 100 is formed by the three-dimensional arrangement of the support fine particles 150 described above.

As shown in FIGS. 1 to 3 as an example of structure model of the supported metal catalyst, the support fine particles 150 comprise four pores of a first pore surrounded by points b1, b2, b5, b4, and b1, where the branches link with each other (may be referred to as branching points, or merely as branch); a second pore surrounded by branching points b1, b2, b3, and b1; a third pore surrounded by branching points b2, b3, b6, b7, b5, and b2; and a fourth pore surrounded by branching points b1, b3, b6, b7, b5, b4, and b1. Here, when a plane surrounded by the branching points of each of the pores (first to fourth pores) is taken as the pore plane, the void 110 is a three-dimensional space surrounded by the four pore planes. The support fine particles 150 comprise a plurality of pores surrounded by a plurality of branching points in which a plurality of branches link with each other. Further, the three-dimensional spaces (voids) which are surrounded by the plurality of pores are provided sequentially, thereby structuring the support fine particles.

Figure 4:
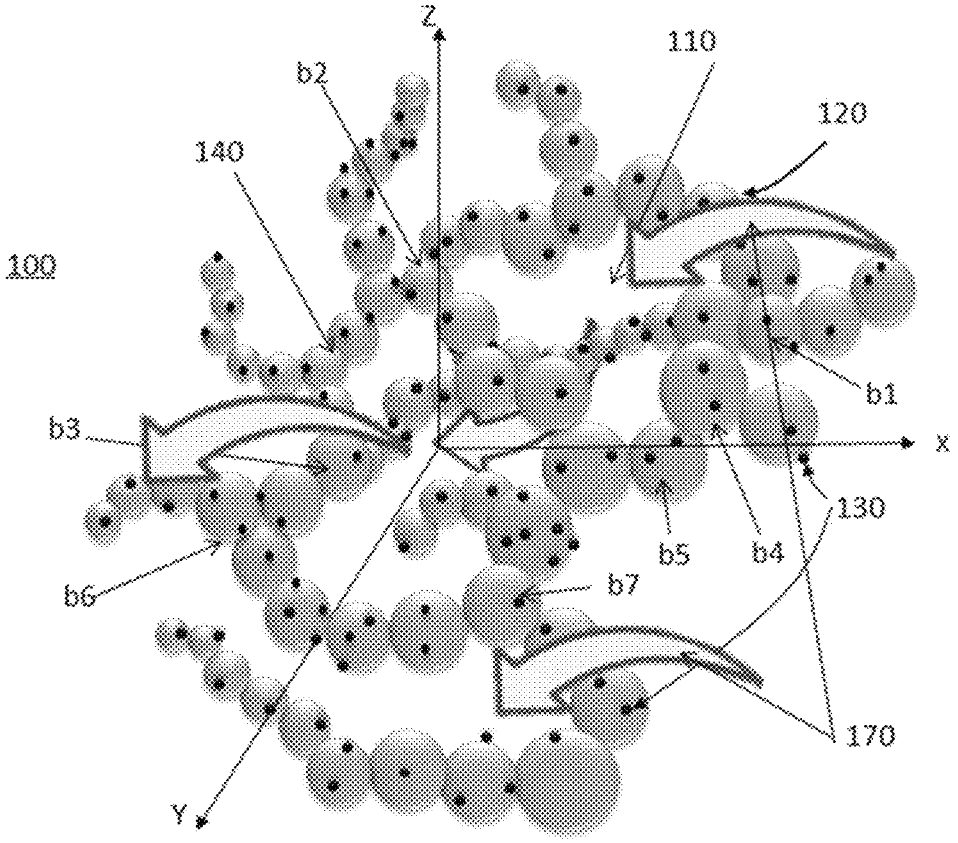
FIG. 4 shows a gas diffusion route in FIG. 1.
Figure 5:
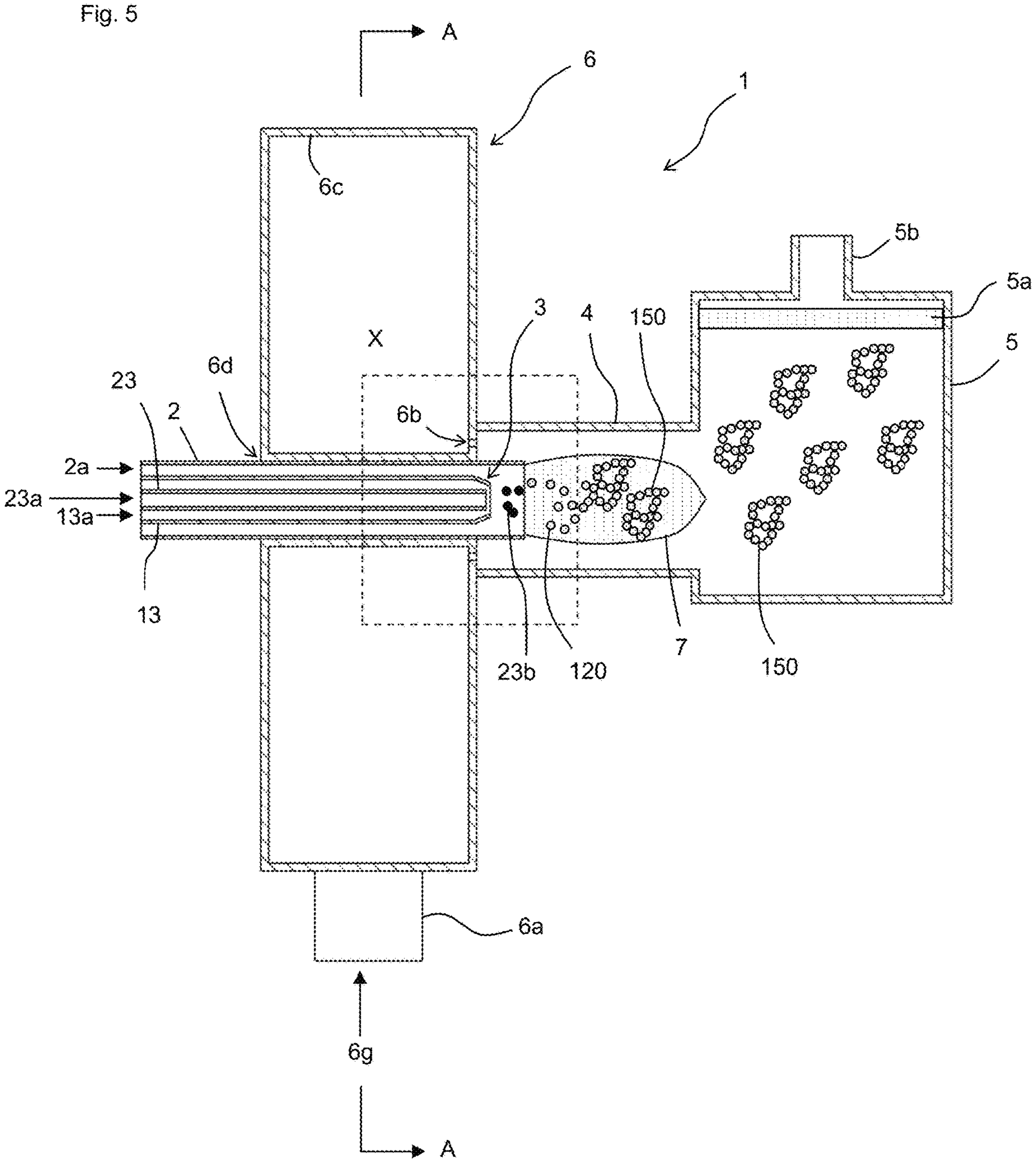
FIG. 5 shows a sectional view which is cut through a center of a burner 2 of a manufacturing apparatus 1 for manufacturing a support powder.
Figure 6:
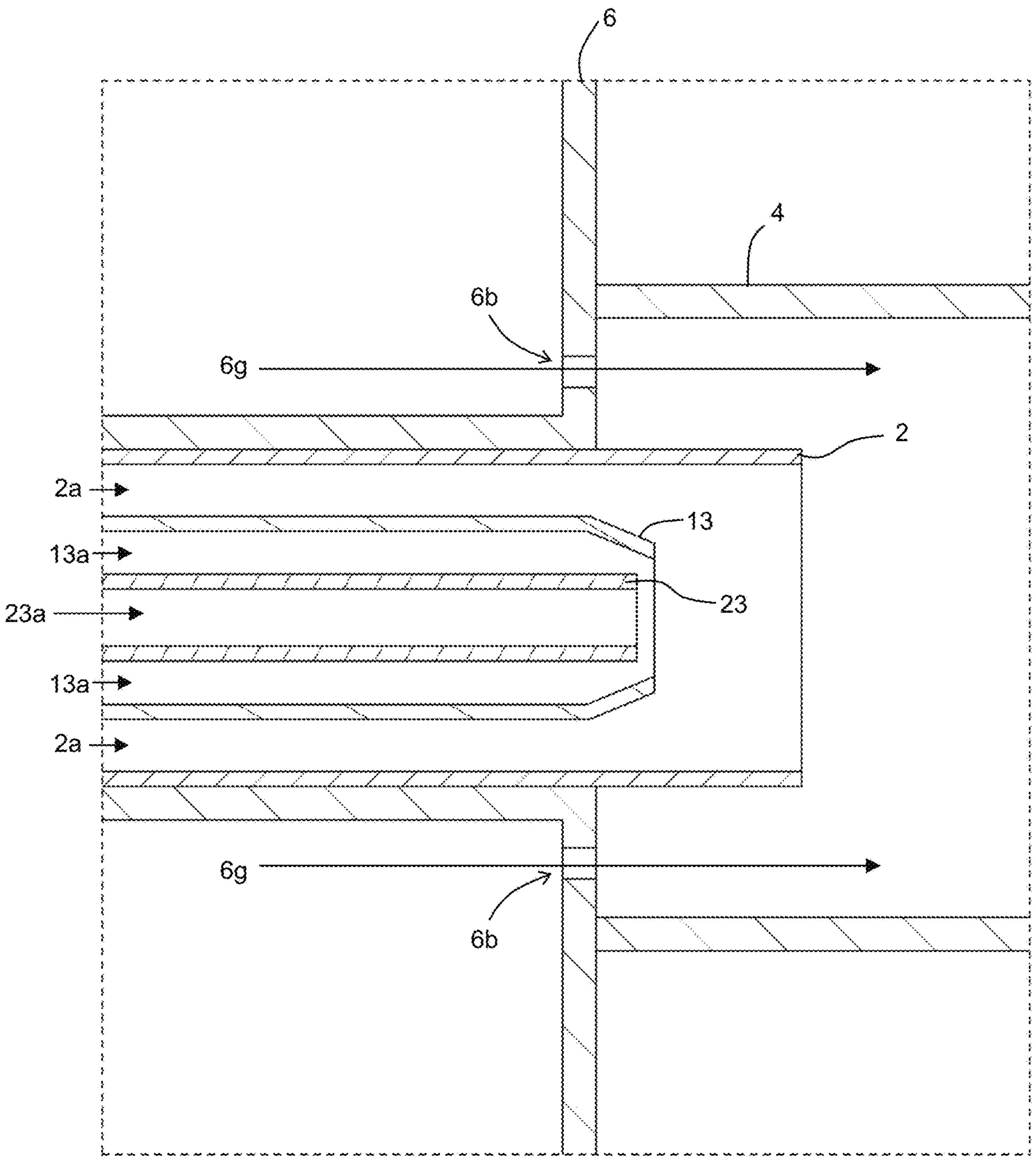
FIG. 6 shows an enlarged view of a region X in FIG. 5.
Figure 7:
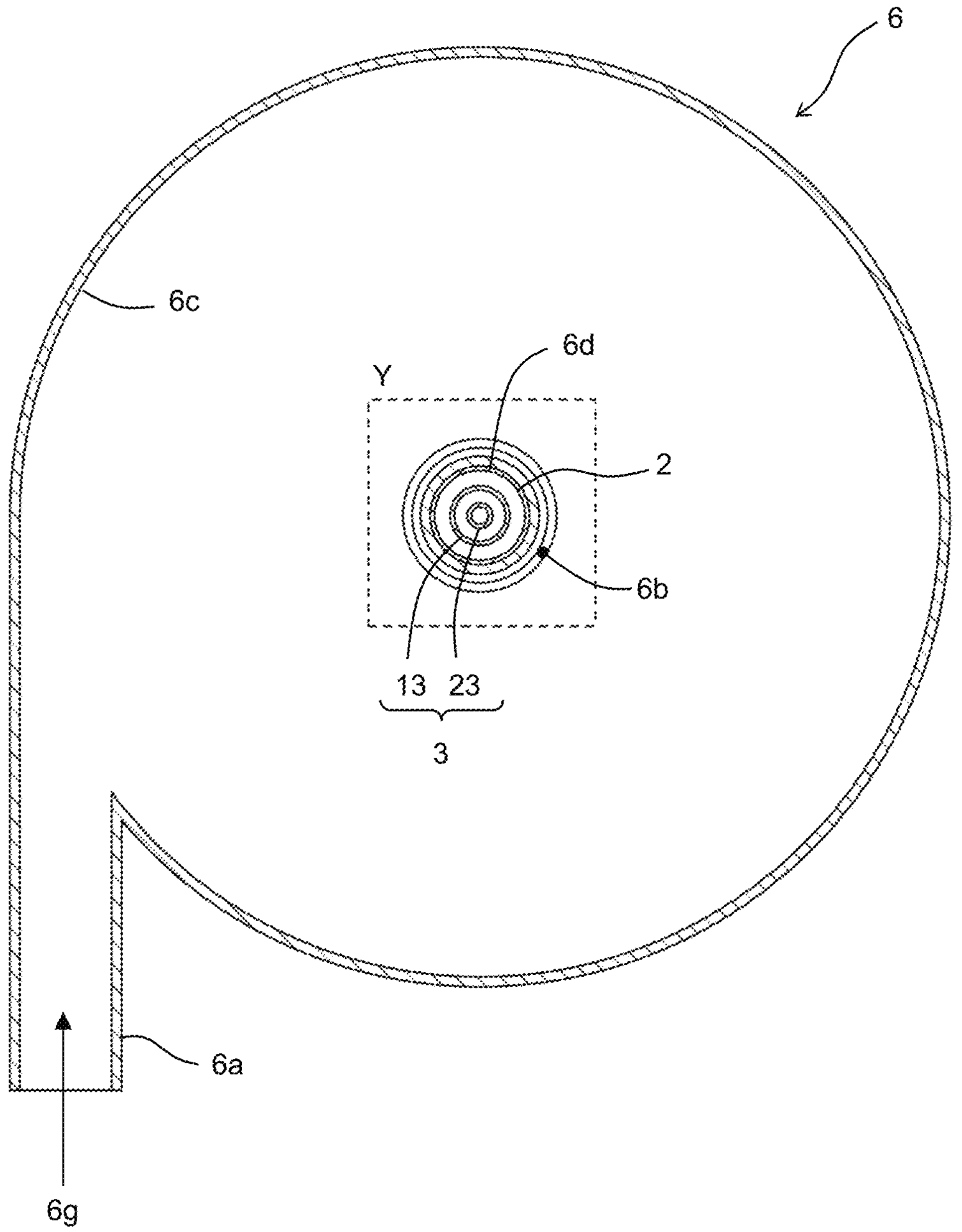
FIG. 7 shows a sectional view taken along a line A-A of FIG. 5.
Figure 8:
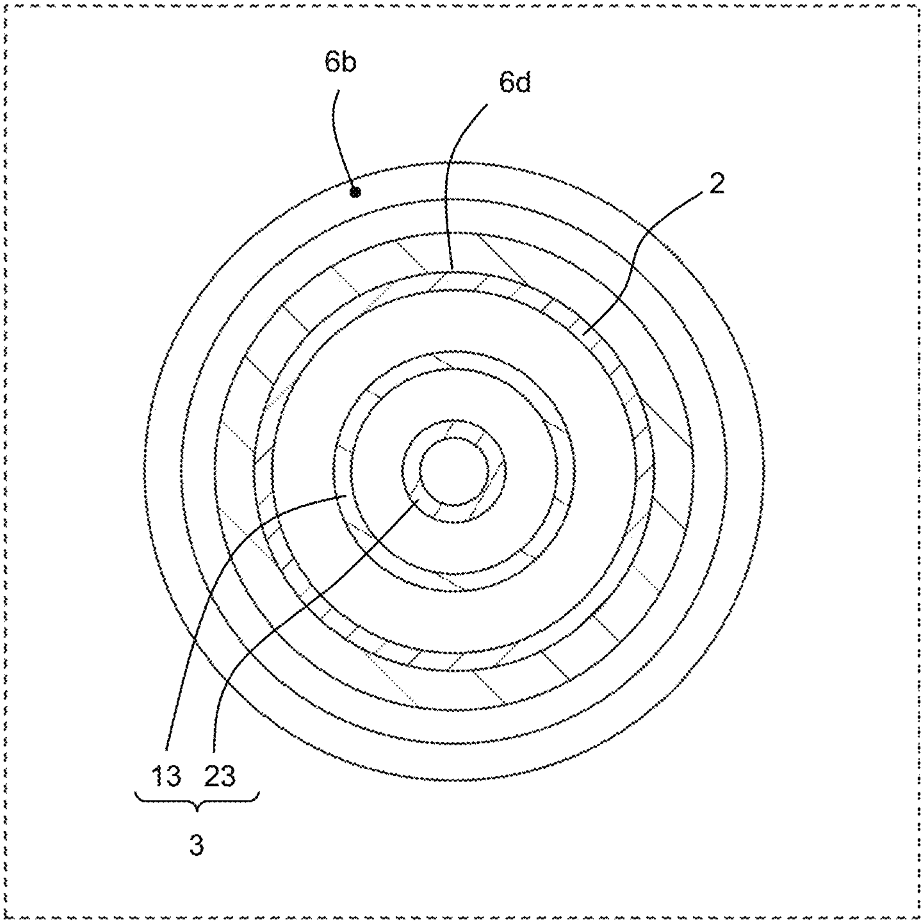
FIG. 8 shows an enlarged view of a region Y in FIG. 7.

Accordingly, the void serves as the gas diffusion route (gas diffusion pathway) of oxygen, hydrogen and the like. FIG. 4 shows the gas diffusion route in FIG. 1. In FIG. 4, one example of the gas diffusion route (gas diffusion pathway) of void 110 is shown. A flow (gas diffusion route) 170 of an oxidant (gas), a fuel gas and the like can flow in the desired direction via the void 110 as shown in FIG. 4. That is, the void 110 serves as the gas diffusion route.

Here, as a simple structure of the support fine particles 150, the support fine particles can have only one pore (for example, the first pore surrounded by the branching points b1, b2, b5, b4, and b1). In such case, a void 110 having a thickness of the crystallite grain of the crystallite 120 is provided. As a simpler structure, the support fine particles 150 can have one or more branches. In such case, the branches within the support fine particles 150 prohibits cohesion of the support fine particles, thereby providing the void 110 between the support fine particles.

Here, the "pore" mentioned above can also be mentioned as closed curve (closed loop). Otherwise, it can be said that a void 110 surrounded by a closed plane including the afore-mentioned plurality of branching points (for example, branching points b1 to b7) is provided. As the branching points b1 to b7, the center of gravity of the crystallite of the metal oxide structuring the support fine particles 150 in which the branches connect with each other can be taken as the branching point, or an arbitrary point in the crystallite can be taken as the branching point.

The size of the crystallite 120 is preferably 10 to 30 nm, more preferably 10 to 15 nm. The size is, particularly for example, 10, 11, 12, 13, 14, 15, 16, 17, 18, 19, 20, 25, or 30 nm, and may be in the range between the two values exemplified herein. The size of the crystallite 120 (crystallite diameter) can be obtained in accordance with Sheller formula using half-width in the XRD pattern peak. If the crystallite 120 is too small, the oxide may be easily eluted and durability of the catalyst may decrease. If the crystallite 120 is too large, a secondary pore volume may be small and a flooding phenomenon may occur more easily.

The aggregate of the support fine particles 150 is in the form of a powder. Such aggregate is referred to as "support powder".

The mean particle size of the support fine particles 150 in the support powder is preferably 0.1 μm to 4 μm, and more preferably 0.5 μm to 2 μm. The mean particle size of the support fine particles 150 can be measured with a laser diffraction/scattering particle size distribution analyzer.

The BET specific surface area of the support powder is preferably 12 $m^2/g$ or larger, and is more preferably 25 $m^2/g$ or larger. The BET specific surface area is, for example, 12 to 100 $m^2/g$, particularly for example, 12, 15, 20, 25, 30, 35, 40, 45, 50, or 100 $m^2/g$, and may be in the range between the two values exemplified herein.

The support powder preferably has a void fraction of 50% or higher, more preferably 60% or higher. The void fraction is, for example, 50 to 80%, particularly for example, 50, 55, 60, 65, 70, 75, or 80%, and may be in the range between the two values exemplified herein. The void fraction can be obtained by mercury press-in method or FIB-SEM.

The support powder preferably has a repose angle of 50 degrees or less, and more preferably a repose angle of 45 degrees or less. In such case, the support powder has a similar flowability as flour, and thus handling is simple. The repose angle is, for example, 20 to 50 degrees, particularly for example, 20, 25, 30, 35, 40, 45, or 50, and may be in the range between the two values exemplified herein. The repose angle can be obtained by a drop volume method.

The electric conductivity of the support powder is preferably 0.001 S/cm or higher, and more preferably 0.01 S/cm or higher. The electric conductivity is, for example, 0.001 to 1000 S/cm, particularly for example, 0.001, 0.01, 0.1, 1, 10, 100, 1000 S/cm, and may be in the range between the two values exemplified herein. The electric conductivity can be measured in accordance with the JIS standard (JIS K 7194).

The support fine particles 150 have a branch 160 comprising a chained portion which is structured by fusion-bonding a plurality of crystallites 120 into a chain. The branch 160 itself has a nature to allow electrons to flow. As shown in FIGS. 1 to 4, the support fine particles 150 have a plurality of branches 160, and the branches connect with each other at branching points (b1 to b7), by which a network is structured. Electrically conductive nature can be seen among these. Accordingly, the branches 160 of the support fine particles 150 shown by the dotted line from point P0 in FIG. 1 itself structures an electron conduction route (electron conduction pathway) 140.

The support fine particles 150 are structured with a metal oxide. The metal oxide is doped with a dopant element. The dopant element is an element having a different valence than a main element. Examples of the main element include tin, titanium, cerium, and zirconium. As the dopant element, at least one is selected among rare earth elements such as yttrium, Group 5 elements such as niobium and tantalum, Group 6 elements such as tungsten, and Group 15 elements such as antimony. When doping is performed with such elements, support fine particles can be imparted with the electric conductivity. Among such elements, Group 5 elements represented by niobium and tantalum, or Group 6 elements represented by tungsten are preferred, and tantalum, niobium, antimony or tungsten are particularly preferred.

The atom ratio of the dopant element with respect to the entire metal contained in the metal oxide is preferably 0.05 to 0.30. In such case, the electric conductivity of the supported metal catalyst 100 becomes particularly high. The atom ratio is, particularly for example, 0.05, 0.10, 0.15, 0.20, 0.25, or 0.30, and may be in the range between the two values exemplified herein.

1-2. Metal Fine Particles 130

The metal fine particles 130 are fine particles of metal which can serve as a catalyst. Preferably, the metal fine particles 130 are constituted of platinum only or an alloy of platinum and other metals (e.g., transition metals). The transition metal is preferably cobalt (Co) or nickel (Ni), and cobalt is particularly preferred.

A ratio of platinum included in the metal fine particles 130 is preferably 80 atomic % or higher. Since metals other than platinum easily elute during operation, the durability of the catalyst is enhanced as the ratio of the platinum becomes higher. The ratio is, particularly for example, 80, 85, 90, 95, or 100 atomic %, and may be in the range between the two values exemplified herein.

The metal fine particles 130 have a crystallite diameter of 2 to 10 nm, which is determined from XRD pattern. When the crystallite diameter is too small, the metal particles 130 easily dissolve as an electrode reaction proceeds. If the crystallite diameter is too large, an electrochemically active surface area becomes small, and thus a desired electrode performance cannot be achieved. The crystallite diameter is, particularly for example, 2, 3, 4, 5, 6, 7, 8, 9, or 10 nm, and may be in the range between the two values exemplified herein. The crystallite diameter can be obtained in accordance with Sheller formula using half-width in the XRD pattern peak.

The ratio of the metal fine particles 130 to a total of the support powder and the metal fine particles 130 is preferably 20 to 50 mass %, more preferably 28 to 50 mass %, and even more preferably 30 to 50 mass %. The higher the ratio is, the more easily the continuum of the metal fine particles is formed by partially fusion-bonding adjacent metal fine particles to each other. On the other hand, when the ratio is too high, there is a case in which the voids in the support fine particles 150 are blocked by the metal fine particles 130, deteriorating mass diffusibility. The ratio is, particularly for example, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 mass %, and may be in the range between the two values exemplified herein.

The supported amount of the metal fine particles 130 can be set in accordance with unit area of a surface area of the support powder, the surface area calculated based on spherical approximation. The spherical approximation is an approximation by which the support powder is regarded as being structured by a sphere-shaped crystallite. According to this approximation, a specific surface area of the support powder (spherical approximation specific surface area) is represented by Mathematical Formula 1.

$$\text{Spherical approximation specific surface area} = \text{surface area of sphere}/\text{mass of sphere} = \text{surface area of sphere}/(\text{volume of sphere} \times \text{specific gravity}) = 4\pi r^2/\{(4/3)\pi r^3 \times \rho\} = 3/(r\rho) = 3/(0.5D\rho) \quad \text{[Math. 1]}$$

In the Mathematical Formula 1, r is the radius, ρ is the specific gravity (true density), D is the crystallite diameter, and r=0.5D.

The supported amount of the metal fine particles 130 per unit area of the surface area of the support powder calculated based on spherical approximation (the spherical approximation-based supported amount) can be calculated by Mathematical Formula 2.

$$\text{Spherical approximation-based supported amount} = \text{ratio of metal fine particles (mass \%)}/\{\text{spherical approximation specific surface area} \times \text{ratio of support powder (mass \%)}\} \quad \text{[Math. 2]}$$

The supported amount is preferably 3.4 to 13.7 (mg/m$^2$), and more preferably 5.3 to 13.7 (mg/m$^2$). The larger the supported amount is, the more easily the continuum of the metal fine particles is formed by partially fusion-bonding adjacent metal fine particles to each other. On the other hand, when the supported amount is too large, there is a case in which the voids in the support fine particles 150 are blocked by the metal fine particles 130, deteriorating mass diffusibility. The supported amount is, particularly for example, 3.4, 3.5, 4.0, 4.5, 5.0, 5.3, 5.5, 6.0, 6.5, 7.0, 7.5, 8.0, 8.5, 9.0, 9.5, 10.0, 10.5, 11.0, 11.5, 12.0, 12.5, 13.0, 13.5, or 13.7 (mg/m$^2$), and may be in the range between the two values exemplified herein.

The supported amount of the metal fine particles 130 may be set in accordance with unit area of the surface area of the support powder, the surface area calculated based on the BET specific surface area of the support powder.

The supported amount of the metal fine particles per unit area of the surface area of the support powder (the BET specific surface area-based supported amount), which is calculated based on the BET specific surface area of the support powder, can be calculated by Mathematical Formula 3.

$$\text{BET specific surface area-based supported amount} = \text{ratio of metal fine particles (mass \%)}/\{\text{BET specific surface area} \times \text{ratio of support powder (mass \%)}\} \quad \text{[Math. 3]}$$

The supported amount is preferably 6.8 to 27.0 (mg/m$^2$), and more preferably 10.5 to 27.0 (mg/m$^2$). The larger the supported amount is, the more easily the continuum of the metal fine particles is formed by partially fusion-bonding adjacent metal fine particles to each other. On the other hand, when the amount supported is too large, there is a case in which the voids in the support fine particles 150 are blocked by the metal fine particles 130, deteriorating mass diffusibility. The supported amount is, particularly for example, 6.8, 7.0, 8.0, 9.0, 10.0, 10.5, 11.0, 12.0, 13.0, 14.0, 15.0, 16.0, 17.0, 18.0, 19.0, 20.0, 21.0, 22.0, 23.0, 24.0, 25.0, 26.0, or 27.0 (mg/m$^2$), and may be in the range between the two values exemplified herein.

The BET specific surface area is measured in a state of the support powder before supporting the metal fine particles 130. This is because the measured value after supporting the metal fine particles 130 does not accurately reflect the specific surface area of the support powder. On the other hand, since the spherical approximation specific surface area is calculated using the crystallite diameter determined from the half-width in the XRD pattern peak of the supported metal catalyst obtained by supporting the metal fine particles 130, it can advantageously be calculated using a sample after supporting the metal fine particles 130.

The electric conductivity of the supported metal catalyst 100 is preferably 0.01 S/cm or higher, and more preferably 0.038 S/cm or higher. The electric conductivity is, for example, 0.01 to 1000 S/cm, particularly for example, 0.01 0.038, 0.1, 0.44, 1, 10, 100, 1000 S/cm, and may be in the range between the two values exemplified herein, or may be equal to or higher than any one of the values exemplified herein.

Defining a peak intensity of (111) plane in the XRD pattern as I1 and a peak intensity of (200) plane as I2, I1/I2≥2.0 is preferred, I1/I2≥2.2 is more preferred, and I1/I2≥2.5 is even more preferred. Since the (111) plane of platinum is more catalytically active than the (200) plane, the larger the value of I1I2, the higher the catalytic activity of the metal fine particles 130 containing platinum. Furthermore, since the (111) plane has a lower surface energy than the (200) plane, the larger the supported amount of the metal fine particles 130 is, the more preferentially the (111) plane with a smaller surface energy is formed, resulting in the larger value of I1/I2. For this reason, the value of I1/I2 can be increased by increasing the supported amount of metal fine particles 130. The value of I1/2 is, for example, 2.0 to 5.0, particularly for example, 2.0, 2.1, 2.2, 2.3, 2.4, 2.5, 2.6, 2.7, 2.8, 2.9, 3.0, 3.5, 4.0, 4.5, or 5.0, and may be in the range between the two values exemplified herein. In the present specification, a peak intensity ratio means an intensity ratio at a peak top.

When the metal of the metal oxide structuring the support fine particles 150 contains tin and the metal fine particles 130 contains platinum, the value of the ratio of {Sn metal peak intensity/$SnO_2$ peak intensity} in the XPS spectrum is preferably 15% or less. The Sn metal peak is a peak derived from the platinum-tin alloy formed at the interface between the metal fine particles 130 and the support fine particles 150. The $SnO_2$ peak is a peak derived from the metal oxide structuring the support fine particles 150. The larger the value of the above ratio is, the more the platinum-tin alloys are formed. Since tin in the platinum-tin alloy is easily eluted, the larger the value of the above-mentioned ratio is, the lower the durability of the supported metal catalyst 100 is. In other words, the durability of the supported metal catalyst 100 can be increased by setting the value of the above-mentioned ratio to 15% or less. The value of the above-mentioned ratio is, particularly for example, 0, 1, 2, 3, 4, 5, 6, 7, 8, 9, 10, 11, 12, 13, 14, or 15%, and may be in the range between the two values exemplified herein, or may be equal to or less than any one of the values exemplified herein.

The Sn metal peak appears at 484.70 eV and the $SnO_2$ peak appears at 486.50 eV. In addition, the intensity at 482.0 eV, which is sufficiently away from these peaks, can be taken as background. Therefore, the peak intensity of Sn metal can be determined by the difference between the intensity at 484.70 eV and the intensity at 482.0 eV, and the peak intensity of $SnO_2$ can be determined by the difference between the intensity at 486.50 eV and the intensity at 482.0 eV.

2. Use of Supported Metal Catalyst 100

The supported metal catalyst 100 is preferably used as an electrocatalyst for an electrochemical cell. The electrochemical cell means a cell that generates an electrochemical reaction. Examples of the electrochemical cell include a fuel cell that generates electricity using a fuel such as hydrogen and methanol by the electrochemical reaction, a hydrogen purifying and pressure boosting device that produces a high-pressure high-purity purified hydrogen gas from a hydrogen-containing gas by the electrochemical reaction, a redox flow battery that charges and discharges by a redox reaction, and a water electrolysis cell that decompose water into hydrogen and oxygen by the electrochemical reaction.

3. Method for Manufacturing Support Powder

First, referring to FIG. 5 to FIG. 8, the manufacturing apparatus 1 which can be used for manufacturing the support powder is explained. The manufacturing apparatus 1 comprises a burner 2, a raw material supplying unit 3, a reaction cylinder 4, a collector 5, and a gas reservoir 6. The raw material supplying unit 3 comprises an outer cylinder 13, and a raw material distribution cylinder 23.

The burner 2 is a cylinder, and the raw material supplying unit 3 is arranged in the burner 2. Burner gas 2*a* is distributed between the burner 2 and the outer cylinder 13. The burner gas 2*a* is used to form a flame 7 at the tip of the burner 2 by ignition. A high temperature region having a temperature of 1000° C. or higher is formed by the flame 7. The burner gas 2*a* preferably contains a combustible gas such as propane, methane, acetylene, hydrogen, or nitrous oxide. In one example, a gas mixture of oxygen and propane can be used as the burner gas 2*a*. The temperature of the high temperature region is 1000 to 2000° C. for example, particularly for example, 1000, 1100, 1200, 1300, 1400, 1500, 1600, 1700, 1800, 1900, or 2000° C., and may be in the range between the two values exemplified herein.

A raw material solution 23*a* for generating the support powder is distributed in the raw material distribution cylinder 23. As the raw material solution 23*a*, the one containing a metal compound is used. As the metal compound, fatty acid metals (Sn, Ti, Ce, Nb, Ta, W, etc.) can be mentioned for example. The number of carbon atoms in the fatty acid is, for example, 2 to 20, preferably 4 to 15, and more preferably 6 to 12. As the fatty acid metal salt, metal octylates (tin octylate, titanium octylate, cerium octylate, niobium octylate, tantalum octylate, tungsten octylate, etc.) are preferred. In the raw material solution 23*a*, the metal compound is preferably dissolved or dispersed in a non-aqueous solvent.

A mist gas 13*a* used for converting the raw material solution 23*a* into a mist is distributed in between the outer cylinder 13 and the raw material distribution cylinder 23. When the mist gas 13*a* and the raw material solution 23*a* are jetted together from the tip of the raw material supplying unit 3, the raw material solution 23*a* is converted into a mist. The mist 23*b* of the raw material solution 23*a* is sprayed into the flame 7, and the metal compound in the raw material solution 23*a* undergoes a thermal decomposition reaction in the flame 7. Accordingly, support powder which is an aggregate of support fine particles 150 having a chained portion structured by fusion-bonding the crystallite 120 into a chain is generated. The mist gas 13*a* is oxygen in one example.

The reaction cylinder 4 is provided between the collector 5 and the gas reservoir 6. The flame 7 is formed in the reaction cylinder 4. The collector 5 is provided with a filter 5*a* and a gas discharging portion 5*b*. A negative pressure is applied to the gas discharging portion 5*b*. Accordingly, a flow which flows towards the gas discharging portion 5*b* is generated in the collector 5 and the reaction cylinder 4.

The gas reservoir 6 has a cylinder shape, and comprises a cold gas introducing portion 6*a* and a slit 6*b*. A cold gas 6*g* is introduced from the cold gas introducing portion 6*a* into the gas reservoir 6. The cold gas introducing portion 6*a* is directed in a direction along the tangential line of the inner peripheral wall 6*c* of the gas reservoir 6. Therefore, the cold gas 6*g* introduced through the cold gas introducing portion 6*a* into the gas reservoir 6 revolves along the inner peripheral wall 6*c*. At the center of the gas reservoir 6, a burner insertion hole 6*d* is provided. The burner 2 is inserted through the burner insertion hole 6*d*. The slit 6*b* is provided in the vicinity of the burner insertion hole 6*d* to surround the burner insertion hole 6*d*. Accordingly, when the burner 2 is inserted through the burner insertion hole 6*d*, the slit 6*b* is provided to surround the burner 2. The cold gas 6*g* in the gas reservoir 6 is driven by the negative pressure applied to the gas discharging portion 5*b*, and is discharged from the slit 6*b* towards the reaction cylinder 4. The cold gas 6*g* can be any gas so long as it can cool the oxide generated, and is preferably an inert gas, for example, air. The flow speed of the cold gas 6*g* is preferably two times or more of the flow speed of the burner gas 2*a*. The upper limit of the flow speed of the cold gas 6*g* is not particularly limited, and is 1000 times the flow speed of the burner gas 2*a* for example. The ratio of flow speed of cold gas 6g/flow speed of burner gas 2*a* is 2 to 1000 for example, and the ratio is particularly for example, 2, 5, 10, 15, 20, 25, 30, 35, 40, 45, 50, 100, 200, 500, or 1000, and may be in the range between the two values exemplified herein. Here, in the present embodiment, a negative pressure is applied to the gas discharging portion 5*b* to allow the cold gas 6*g* to flow. However, a positive pressure can be applied to the gas introducing portion 6*a* to allow the cold gas 6*g* to flow.

In the present embodiment, since the cold gas 6*g* is supplied to the surroundings of the flame 7 through the slit 6*b*, the cold gas 6*g* flows around the flame 7 in a laminar flow. For this reason, the mist 23*b*, the crystallites 120, and the support fine particles 150 are not disturbed by the cold gas 6*g* and are fully heated by the flame 7 while moving along the flame 7, by which the reaction proceeds. Furthermore, since the support fine particles 150 are cooled by the cold gas 6*g* immediately after the support fine particles 150 get out of the flame 7, the structure having the chained portion is maintained. The cooled support fine particles 150 are captured and collected by the filter 5*a*.

In the present embodiment, the support powder which is an aggregate of the support fine particles 150 can be manufactured by using the manufacturing apparatus 1. Here, a high-temperature region of 1000° C. or higher is formed at the tip of the burner 2 by the flame 7, and the metal compound is allowed to undergo a thermal decomposition reaction in this high-temperature region while supplying the cold gas 6*g* through the slit 6*b* to the surroundings of the high-temperature region. The high-temperature region can be formed by plasma instead of the flame 7.

4. Method for Manufacturing Supported Metal Catalyst 100

The method for manufacturing the supported metal catalyst 100 comprises a support powder generating step, a supporting step, a heat treatment step, and a reduction step.

Support Powder Generating Step

In the support powder generating step, the support powder is generated by the above-mentioned method.

Supporting Step

In the supporting step, the metal fine particles 130 are supported on the support powder. Such supporting can be performed by a reverse micelle method, a colloidal method, an impregnation method and the like. The colloidal method is preferred because it prevents the metal fine particles 130 from overlapping each other even when the supported amount of the metal fine particles 130 is large.

In the colloidal method, the metal colloidal particles are adsorbed onto the support powder. More particularly, the metal colloidal particles fabricated by the colloidal method is dispersed in an aqueous solution to prepare a dispersion, and then the metal colloidal particles are added and mixed in the dispersion. Accordingly, the colloidal particles are adsorbed onto the surface of the support powder. The support powder having the colloidal particles adsorbed thereon is then filtered and dried, thereby being separated from the dispersion medium. In one example, the metal colloidal particles can be fabricated by adding a reducing agent to a solution containing a metal-containing colloidal precursor and by reducing the precursor, but the metal-containing colloidal precursor may be used as it is as the metal colloidal particles.

Heat Treatment Step

In the heat treatment step, heat treatment is performed after the adsorbing step to convert the metal colloidal particles into the metal fine particles 130. The temperature of the heat treatment is, for example, 150 to 750° C., particularly for example, 500, 550, 600, 650, 700, or 750° C., and may be in the range between the two values exemplified herein. During this heat treatment step, crystallites grow. If the heat treatment temperature is too low, the crystallites 120 of the support fine particles 150 do not grow sufficiently and are easily eluted. On the other hand, the higher the heat treatment temperature, the smaller the secondary pore volume. For this reason, if the heat treatment temperature is too high, the secondary pore volume becomes too small and a flooding phenomenon easily occurs.

The heat treatment duration time is, for example, 0.1 to 20 hours, preferably 0.5 to 5 hours. The heat treatment duration time is, particularly for example, 0.1, 0.5, 1, 2, 3, 4, 5, 6, 7, 8, 9, 10, 15, or 20 hours, and may be in the range between the two values exemplified herein.

The heat treatment can be carried out under an inert gas atmosphere such as nitrogen, or under an inert gas atmosphere containing 1 to 4% of hydrogen.

Reduction Step

Since at least the surfaces of the metal fine particles 130 after the heat treatment step are usually in a state of being oxidized, it is preferable to perform the reduction step after the heat treatment step. In the reduction step, a reduction treatment of the metal fine particles 130 is carried out. The reduction treatment can be carried out by performing a heat treatment under a reductive atmosphere containing a reductive gas such as hydrogen. The reduction step can be omitted when unnecessary.

The temperature of the heat treatment is, for example, 70 to 300° C., and preferably 100 to 200° C. This temperature is, particularly for example, 70, 80, 90, 100, 110, 120, 130, 140, 150, 160, 170, 180, 190, 200, 250, or 300° C., and may be in the range between the two values exemplified herein.

The heat treatment duration time is, for example, 0.01 to 20 hours, and preferably 0.1 to 5 hours. The heat treatment duration time is, particularly for example, 0.01, 0.05, 0.1, 0.5, 1, 2, 3, 4, 5, 6, 7, 8, 9, 10, 15, or 20 hours, and may be in the range between the two values exemplified herein.

When the reductive gas is hydrogen, the concentration thereof is, for example, 0.1 to 100 volume %, preferably 0.2 to 10 volume %, and more preferably 0.5 to 3 volume %. This concentration is, particularly for example, 0.1, 0.2, 0.5, 1, 1.5, 2, 2.5, 3, 10, or 100 volume %, and may be in the range between the two values exemplified herein.

The metal fine particles 130 after the heat treatment in the heat treatment step may be in an oxidized condition. In such case, the metal fine particles 130 may not show catalyst activity. In this case, the catalyst activity can be increased by reducing the metal fine particles 130.

When the metal of the metal oxide structuring the support fine particles 150 contains tin and the metal fine particles 130 contain platinum, the heat treatment in the reducing atmosphere promotes the formation of a platinum-tin alloy at the interface between the support fine particles 150 and the metal fine particles 130. Since tin in the platinum-tin alloy is easily eluted, the durability deteriorates once the platinum-tin alloy is formed at this interface.

As the reduction treatment method for suppressing the formation of the platinum-tin alloys, a potential sweep can be mentioned. The potential sweep can be performed by repeating a cycle in which the potential of the metal fine particles 130 is reciprocated between a lower limit and an upper limit. By performing the potential sweep, the oxide formed on the surface of the metal fine particles 130 is metallized. The lower limit value is, for example, 0.075 to 0.15 V, and the upper limit value is, for example, 1.0 to 1.5 V. The potential difference between the lower limit and the upper limit is, for example, 0.85 to 1.425 V. The speed of the potential sweep is, for example, 2 to 200 mV/s, particularly for example, 2, 10, 50, 100, 150, or 200 mV/sec, and may be in the range between the two values exemplified herein. The number of cycles of the potential sweep is preferably 10 or more, for example, 10 to 100, particularly for example, 10, 20, 30, 40, 50, 60, 70, 80, 90, or 100, and may be in the range between the two values exemplified herein, or may be equal to or more than any one of the values exemplified herein.

The potential sweep is preferably performed under an inert gas atmosphere such as nitrogen. The potential sweep is preferably performed at 15 to 60° C., and more preferably at 20 to 50° C. The temperature is, particularly for example, 15, 20, 30, 40, 50, or 60° C., and may be in the range between the two values exemplified herein.

In one example, the potential sweep can be implemented in an electrochemical cell by incorporating the supported metal catalyst, which has not been reduced after the heat treatment step, into the electrochemical cell as an electrocatalyst.

EXAMPLES

The supported metal catalyst was manufactured in accordance with the method described below, and various evaluations were performed.

1. Manufacture of Supported Metal Catalyst 100

Example 1

Manufacture of Support Powder

By using the manufacturing apparatus 1 shown in FIGS. 5 to 8, support powder was manufactured. As the burner gas 2*a*, gas prepared by blending 5 L/min of oxygen and 1 L/min of propane gas was used. This gas was ignited to form a flame (chemical flame) 7 of 1600° C. or higher at the tip of the burner 2. The raw material solution 23*a* was prepared by blending tin octylate and niobium octylate by a molar ratio of 0.95:0.05, and then the blend was further combined with mineral spirit terpen and dissolved. Oxygen was used as the mist gas 13*a*. 9 L/min of the mist gas 13*a* and 3 g/min of the raw material solution 23*a* were blended and sprayed from the tip of the raw material supplying unit 3 which is a spray nozzle (atomizer) towards the center portion of the flame, thereby allowing combustion of the blend and generation of the support powder which is an aggregate of the support fine particles 150. During such, negative pressure was applied to the gas discharging portion 5*b* to suction air from slit 6*b* at a flow rate of 170 L/min, thereby collecting the generated support powder in the collector 5 (with filter 5*a*). The raw material supplying unit 3 comprises a double tube structure (overall length of 322.3 mm). Oxygen is supplied from the outer cylinder 13, and the raw material solution 23*a* is supplied to the raw material distribution cylinder 23. At the tip of the raw material distribution cylinder 23, a fluid nozzle and an air nozzle are provided, and the raw material solution 23*a* was converted into the mist 23*b* at this position. The amount of the support powder collected was 10 g or more when the operation was carried out for 60 minutes.

Support, Heat Treatment, and Reduction of Metal Fine Particles 130

Subsequently, the metal fine particles 130 were supported onto the support powder, and the heat treatment and the reduction were performed.

Supporting Step

First, 0.57 mL of platinum chloride hexahydrate solution was dissolved in 38 ml of super pure water, and then 1.76 g of sodium sulfite was added and stirred.

The solution was diluted with 150 ml of water, and pH of the solution was adjusted to 5 with NaOH. Thereafter, 25 ml of hydrogen peroxide was added, and the pH was readjusted to 5 with NaOH.

To the dispersion, a dispersion prepared by dispersing 0.45 g of the support powder in 15 mL of super pure water was added, and the mixture was agitated for 3 hours at 90° C. The mixture was cooled to room temperature, and was then filtrated. The residue was washed with super pure water and alcohol, and was then dried overnight at 80° C. to support the metal fine particles 130 onto the support powder.

Heat Treatment Step

In the heat treatment step, samples after the supporting step were heat-treated at 400° C. for 2 hours under a nitrogen atmosphere.

Reduction Step

In the reduction step, the samples after the heat treatment step were heat-treated at 150° C. for 2 hours under a 1% hydrogen atmosphere to reduce the metal fine particles 130.

The supported metal catalyst 100 in which the metal fine particles 130 were supported on the support powder was obtained by the above-mentioned steps.

Examples 2 to 5 and Comparative Examples 1 to 2

The supported metal catalyst 100 was manufactured in the same manner as Example 1, except for altering the amount of the support powder added in the supporting step.

Examples 6 to 8

In Examples 6 to 8, the supported metal catalyst 100 was manufactured in the same manner as Examples 2, 4, and 5, except for not performing the reduction step, respectively.

2. Various Measurements, Calculations, and Evaluations

Various measurements, calculations, and evaluations shown in Table 1 were performed.

TEM Images

Figure 9A:
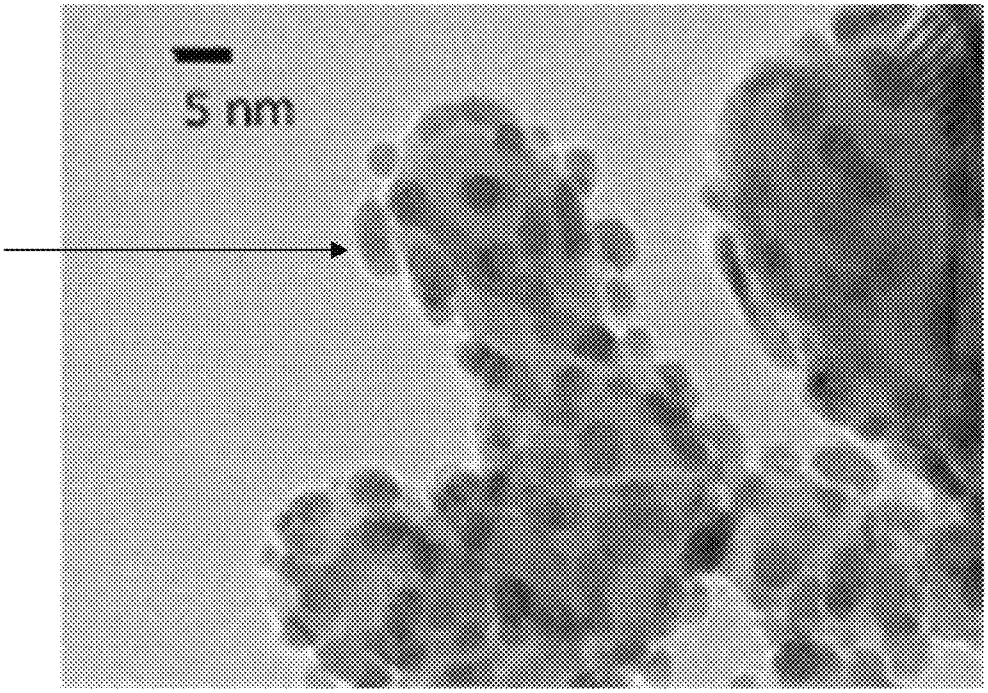
FIG. 9A shows a TEM image of the supported metal catalyst 100 of Comparative Example 1.
Figure 9B:
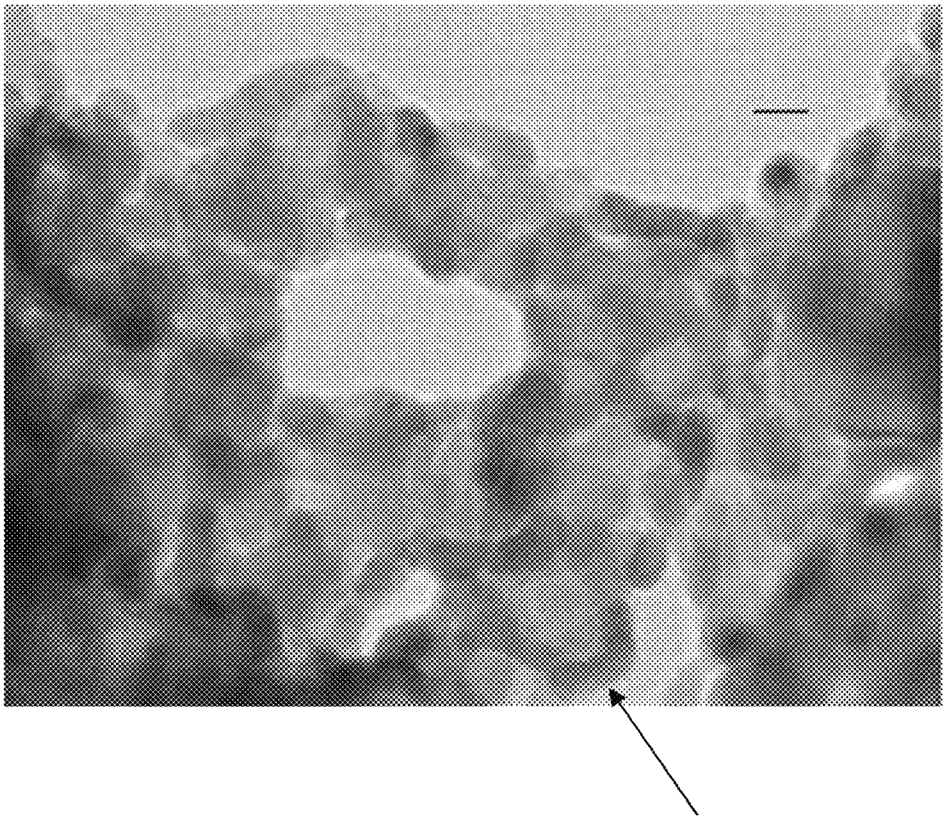
FIG. 9B shows a TEM image of the supported metal catalyst 100 of Example 4.

TEM images of the supported metal catalyst 100 of Comparative Example 1 and Example 4 were taken. FIG. 9A shows the TEM image of the supported metal catalyst 100 of Comparative Example 1 and FIG. 9B shows the TEM image of the supported metal catalyst 100 of Example 4.

It is found that in the supported metal catalyst 100 of Comparative Example 1, as shown in FIG. 9A, each of the metal fine particles 130 exists in isolation. On the other hand, it is found that in the supported metal catalyst 100 of Example 4, as shown in FIG. 9B, the adjacent metal fine particles 130 are partially fusion-bonded to each other, resulting in the formation of a wire-shaped continuum of the metal fine particles 130 extending along the surface of the support powder.

BET Specific Surface Area 0.2 g of the sample of the support powder was weighed and charged into a measuring glass cell and dehydrated under a reduced pressure condition at 130° C. for 1 to 2 hours until the pressure reached 30 mmTorr or lower. The sample was then slowly cooled to room temperature and purged with nitrogen. Thereafter, the BET specific surface area was determined by the BET method using a Micromeritics TriStar 3000 measuring device under a relative atmospheric pressure condition of 0.01 to 0.30. The measured BET specific surface area was 37 $m^2/g$.

Crystallite Diameter of Support Powder

XRD measurements were performed on the supported metal catalyst 100, and the crystallite diameter of the support powder was calculated in accordance with Sheller formula using half-width in the XRD pattern peak. The crystallite diameter was 12 nm.

Spherical Approximation Specific Surface Area of Support Powder

The spherical approximation specific surface area was calculated by substituting the crystallite diameter D of the support powder (12 nm) and the specific gravity p of the support powder (6.85 $g/cm^3$) into Mathematical Formula 1. The spherical approximation specific surface area was 73 $m^2/g$.

BET Specific Surface Area-Based Supported Amount

The BET specific surface area-based supported amounts calculated based on Mathematical Formula 3 are shown in Table 1.

Spherical Approximation-Based Supported Amount

The spherical approximation-based supported amounts calculated based on Mathematical Formula 2 are shown in Table 1.

Peak Intensity and Crystallite Diameter of Metal Fine Particles

XRD measurements were performed on the supported metal catalyst 100 to calculate the intensity ratio of the metal fine particles (=the peak intensity I1 of (111) plane/the peak intensity I2 of (200) plane) from the XRD pattern. In addition, the crystallite diameter of the metal fine particles was calculated in accordance with Sheller formula using half-width in the (200) peak. The calculated results are shown in Table 1. As shown in Table 1, it is found that the larger the ratio of the metal fine particles 130 is, the larger the peak intensity ratio is.

Electric Conductivity

Figure 12:
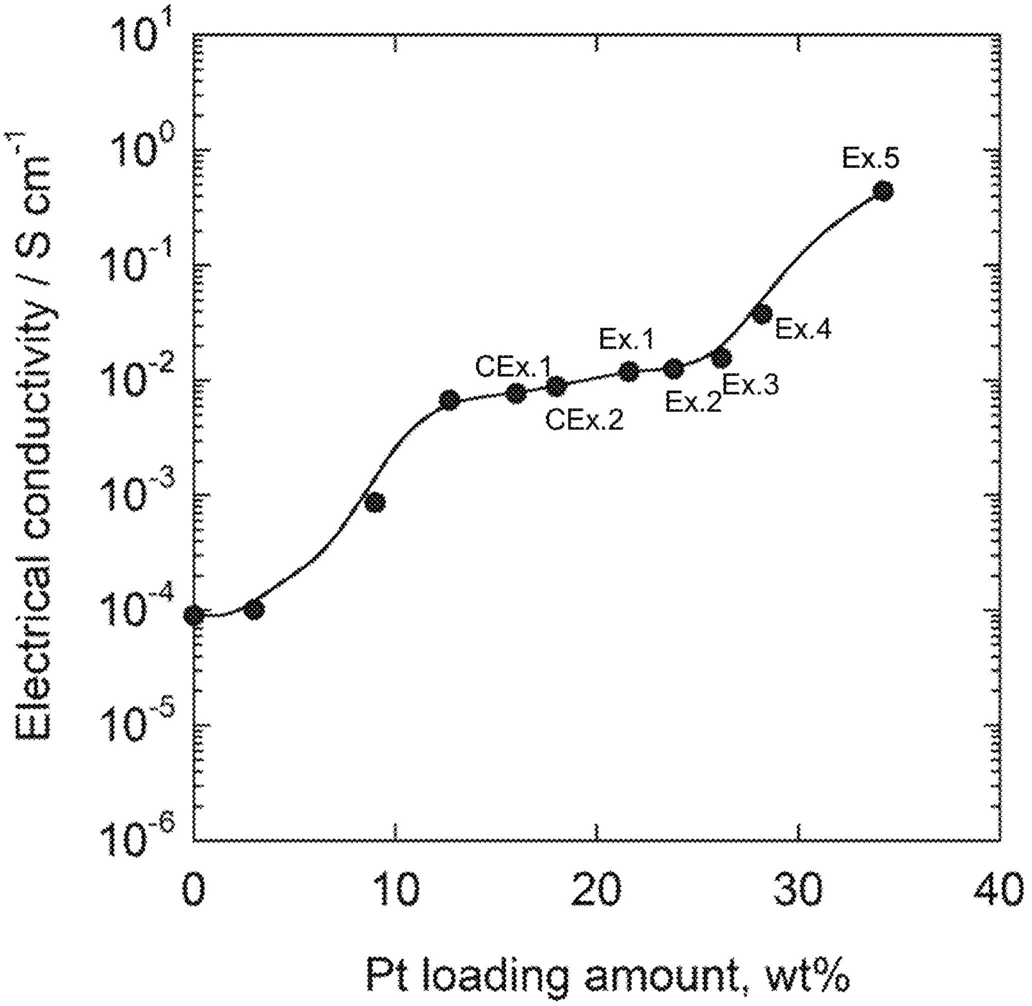
FIG. 12 is a graph showing a relationship between a platinum supporting rate and an electric conductivity.

Each catalyst was filled in a uniaxial pressurizing device and a resistance thereof was measured when it was compressed at a pressure of 16 MPa. Four levels of different amounts of the catalysts were measured, and electric resistances of the catalysts were calculated based on a slope of a straight line obtained from a correlation between the electric resistance obtained and the thickness or weight of the sample. The electric resistances calculated were converted into electric conductivities. The results obtained are shown in Table 1 and FIG. 12. Ex in FIG. 12 indicates Example and CEx indicates Comparative Example. The electric conductivities in a case that the supported amount of platinum is 0, 4, 10, or 14 mass %, which are not shown in Table 1, are also illustrated in FIG. 12.

Mass Activity

The mass activity of the supported metal catalyst 100 was measured by the following method. The results are shown in Table 1. It is found that the higher the peak intensity ratio is, the higher the mass activity is, as shown in Table 1.

Rotating Disk Method

Figure 10:
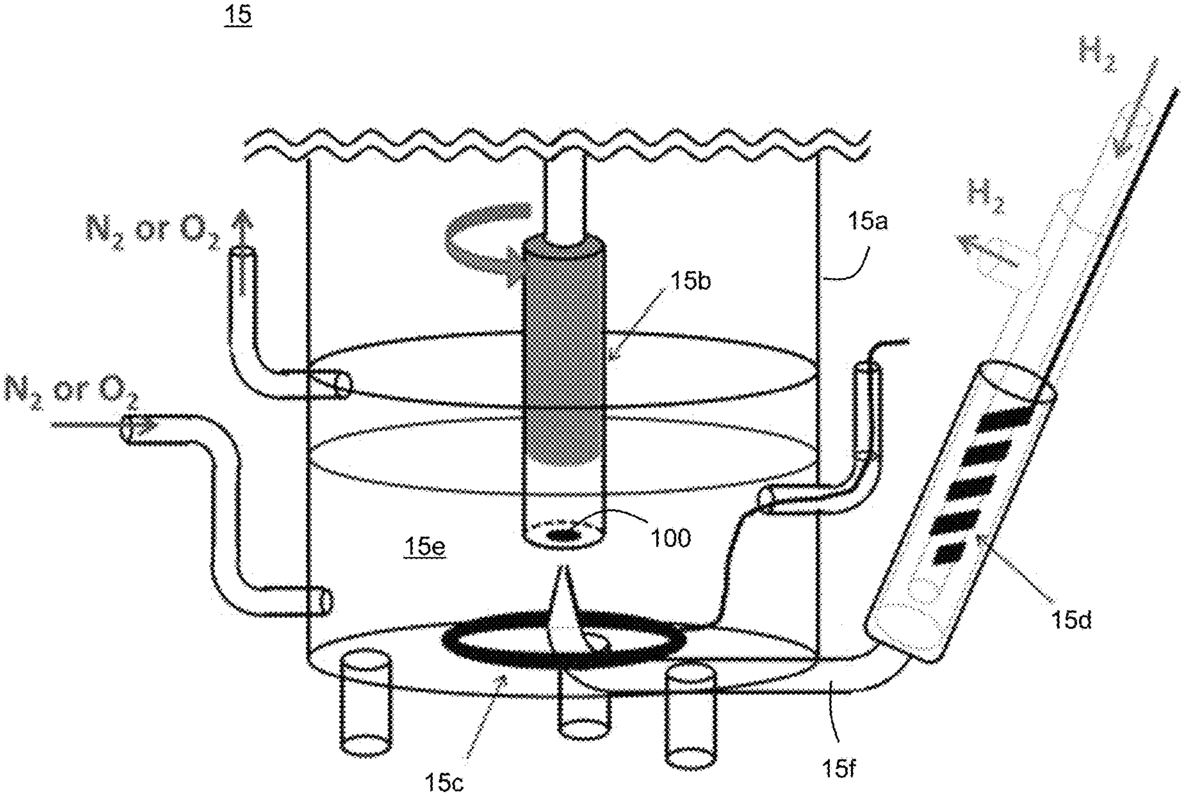
FIG. 10 shows a configuration of an apparatus for measuring a mass activity by a rotating disk method.

The mass activity of the supported metal catalyst 100 was measured by using a three-electrode electrochemical measuring apparatus 15 shown in FIG. 10. The apparatus 15 comprises a glass cell 15*a*, an action electrode 15*b*, a counter electrode 15*c*, and a reference electrode 15*d*. The potential of the action electrode 15*b* to the reference electrode 15*d* is adjustable by an unshown potentiostat. An electrolyte solution (0.1 M-HC104) 15*e* is stored in the glass cell 15*a*. Nitrogen or oxygen can be blown into the electrolyte solution 15*e*. The action electrode 15*b* is columnar and made of glassy carbon (GC), and a lower surface thereof is coated with an electrocatalyst 50. The lower surface of the action electrode 15*b*, and the counter electrode 15*c* are immersed in the electrolyte solution 15*e*. The reference electrode 15*d* is communicated to the electrolyte solution 15*e* by a liquid junction formed by a salt bridge 15*f*.

The supported metal catalyst 100 dispersed in a mixture of 80 wt % water and 20 wt % ethanol was coated to the lower surface of the action electrode 15*b* and dried. The electrolyte solution 15*e* was purged by blowing nitrogen thereinto before the measurement. During the measurement, oxygen was blown thereinto at a flow rate of 100 ml/min, and the reference electrode 15*d* was rotated around a central axis thereof. Under such a condition, the potential of the action electrode 15*b* to the reference electrode 15*d* (Potential/V vs RHE) was set to 0.85 or 0.9 V, and the current value was measured.

Single Cell

In a standard cell made by Japan Automobile Research Institute (JARI), a single cell was constituted by using the supported metal catalyst 100 of Examples and Comparative Examples as a cathode catalyst. The amount of the supported metal catalyst 100 used was 0.10 $mg/cm^2$. The current value was measured when the single cell was operated with a temperature of 120° C., a hydrogen gas pressure of 200 kPa, and an output of 0.85 V.

TABLE 1

| | Examples | | | | | Comparative Examples | |
|---|---|---|---|---|---|---|---|
| | 1 | 2 | 3 | 4 | 5 | 1 | 2 |
| Ratio of Metal Fine Particles (mass %) | 21.6 | 24 | 26 | 28 | 34 | 16 | 18 |
| BET Specific Surface Area-based Supported Amount ($mg/m^2$) | 7.4 | 8.5 | 8.6 | 10.5 | 13.9 | 5.1 | 5.2 |

TABLE 1-continued

| | Examples | | | | | Comparative Examples | |
|---|---|---|---|---|---|---|---|
| | 1 | 2 | 3 | 4 | 5 | 1 | 2 |
| Spherical Approximation-based Supported Amount (mg/m$^2$) | 3.8 | 4.3 | 4.4 | 5.3 | 7.1 | 2.6 | 2.7 |
| (111) Peak Intensity of Metal Particles I1/ (200) Peak Intensity of Metal Particles I2 | 2.06 | 2.08 | 2.1 | 2.39 | 2.72 | 1.82 | 2.03 |
| Crystallite Diameter of Metal Fine Particles (nm) | 3.8 | 3.9 | 4.0 | 4.2 | 4.2 | 3.7 | 3.4 |
| Electric Conductivity (×10$^{-2}$ S/cm) | 1.2 | 1.3 | 1.57 | 3.8 | 44 | 0.96 | 0.89 |
| Mass Activity (A/mg$^{Pt}$) @0.85 V (Rotating Disk Method) | 6.5 | 7.1 | 6.6 | 7.8 | 9.8 | 5.9 | 6.5 |
| Mass Activity (A/mg$^{Pt}$) @0.9 V (Rotating Disk Method) | 0.21 | 0.23 | 0.24 | 0.24 | 0.48 | 0.19 | 0.21 |
| Mass Activity (A/mg$^{Pt}$) @0.85 V (Single Cell) | 0.4 | 0.45 | 0.47 | 0.49 | 0.55 | 0.38 | 0.4 |

Power Generation Performance of Single Cell

The power generation performance of the single cell described above was evaluated using the supported metal catalyst 100 of Example 1 and Comparative Example 1.

Figure 11:
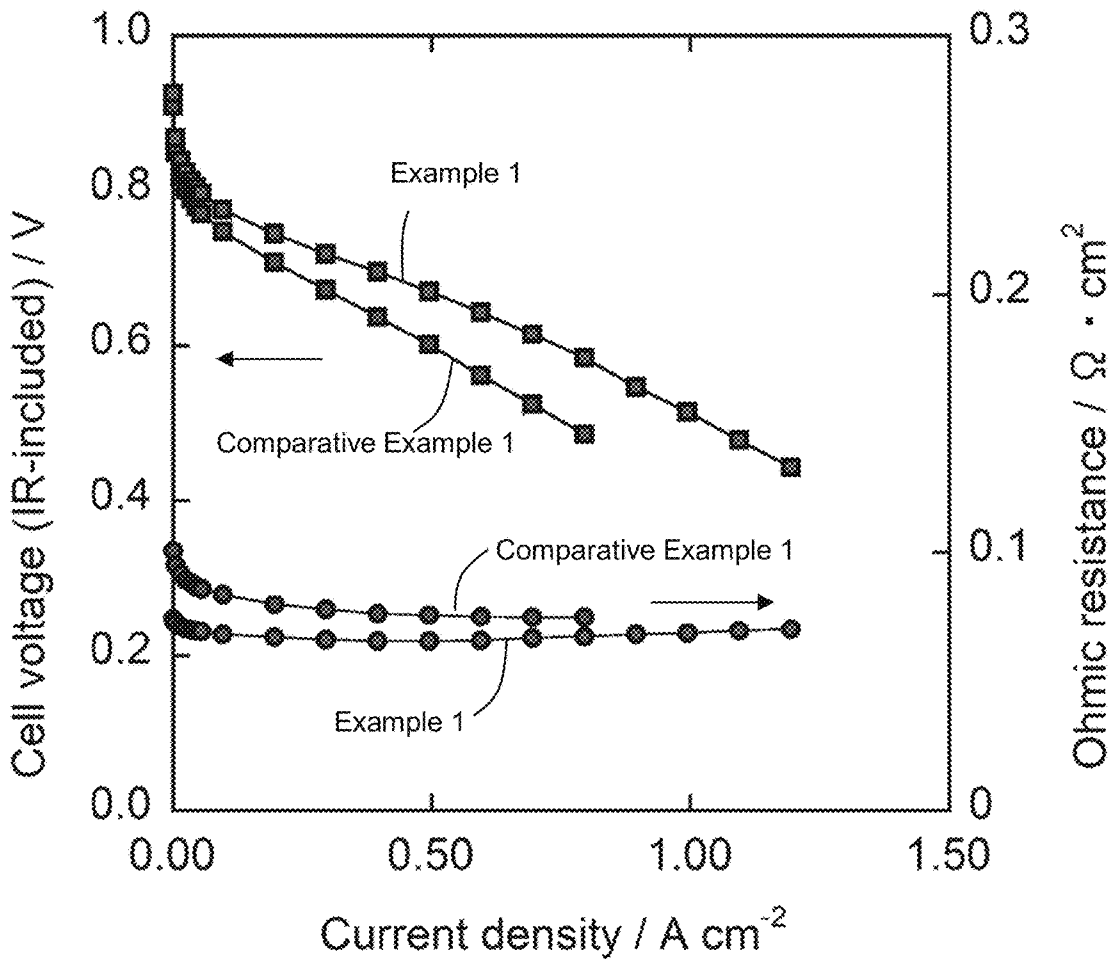
FIG. 11 is a graph showing results of evaluating a power generation performance of a single cell using the supported metal catalyst 100 of Example 1 and Comparative Example 1.

The results are shown in FIG. 11. It was confirmed that a current density at each potential was increased in addition to a decrease in cell resistance and an output was improved in Example 1, compared to Comparative Example 1. It was also found that the increased resistance at a high potential due to the electron depletion layer, which had been an issue in conventional catalysts supported by a ceramic support, was also mitigated, and the supported metal catalyst 100 of Example 1 was found to be effective in improving output at high potentials, including operation at high temperatures.

XPS

By using the supported metal catalyst 100 prepared in Examples 6 to 8, single cells were prepared in the same manner as described above and conditioning was performed. The conditioning was performed by repeating a cycle of the cathode potential sweep 20 times, which is the cycle to reciprocate a cathode potential between 0.05 V and 1.5 V in nitrogen at room temperature. The speed of the potential sweep was set to 100 mV/s. The supported metal catalyst 100 is reduced and activated by the conditioning.

The supported metal catalyst after the conditioning was taken out of the single cell and XPS measurement was performed. The XPS measurement was performed by JPS-9010MC made by JEOL. The results obtained are shown in FIG. 13.

Figure 13:
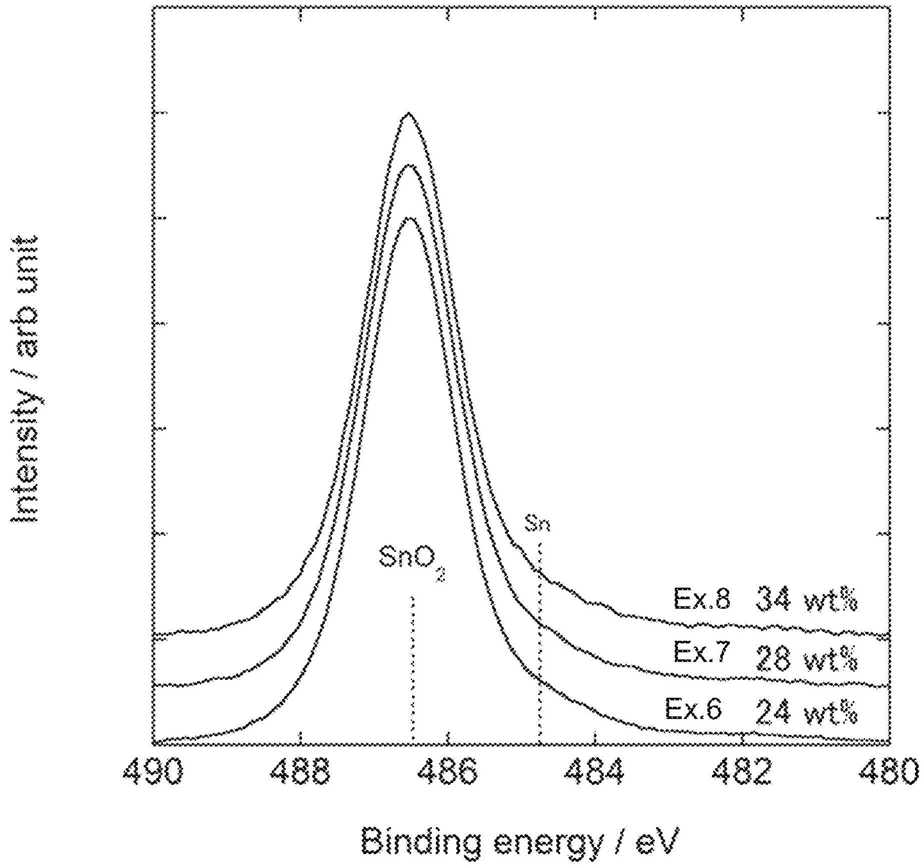
FIG. 13 shows XPS spectra of the supported metal catalyst 100 of Examples 6 to 8.

The peak intensities of Sn metal and $SnO_2$ were read from the XPS spectrum shown in FIG. 13, and the intensity ratios thereof were calculated. The results are shown in Table 2.

TABLE 2

| | Examples | | |
|---|---|---|---|
| | 6 | 7 | 8 |
| Peak Intensity of Sn metal | 9.09 | 9.50 | 9.50 |
| Peak Intensity of $SnO_2$ | 87.17 | 86.93 | 86.70 |
| Peak Intensity Ratio (%) | 10.4% | 10.9% | 11.0% |

As shown in FIG. 13, since no clear peak appears at 484.70 eV attributed to Sn metal and the peak intensity ratio is as low as 11.0% or less, it is found that the formation of the platinum-tin alloy is sufficiently suppressed in Examples 6 to 8.

REFERENCE SIGN LIST

1: manufacturing apparatus, 2: burner, 2*a*: burner gas, 3: raw material supplying unit, 4: reaction cylinder, 5: collector, 5*a*: filter, 5*b*: gas discharging portion, 6: gas reservoir, 6*a*: cold gas introducing portion, 6*b*: slit, 6*c*: inner peripheral wall, 6*d*: burner insertion hole, 6*g*: cold gas, 7: flame, 13: outer cylinder, 13*a*: mist gas, 15: electrochemical measuring apparatus, 15*a*: glass cell, 15*b*: action electrode, 15*c*: counter electrode, 15*d*: reference electrode, 15*e*: electrolyte solution, 15*f*: salt bridge, 23: raw material distribution cylinder, 23*a*: raw material solution, 23*b*: mist, 100: supported metal catalyst, 110: void, 120: crystallite, 130: metal fine particles, 150: support fine particles, 160: branch

The invention claimed is:

1. A supported metal catalyst, comprising:
a support powder, and
metal fine particles supported on the support powder; wherein:
the support powder is an aggregate of support fine particles;
the support fine particles have a chained portion structured by a plurality of crystallites being fusion-bonded to form a chain;
the support fine particles are structured with a metal oxide;
a supported amount of the metal fine particles per unit area of a surface area of the support powder calculated based on spherical approximation is 5.3 to 13.7 (mg/m$^2$); and
a value of I1/I2 is equal to or greater than 2.2,
where I1 represents a peak intensity of (111) plane in a XRD pattern of the metal fine particles, and I2 represents a peak intensity of (200) plane in the XRD pattern of the metal fine particles.

2. The supported metal catalyst of claim 1, wherein a ratio of the metal fine particles to a total of the support powder and the metal fine particles is 20 to 50 mass %.

3. The supported metal catalyst of claim 1, wherein the value of I1/I2 is equal to or greater than 2.5.

4. The supported metal catalyst of claim 1, wherein an electric conductivity of the supported metal catalyst is 0.01 S/cm or higher.

5. The supported metal catalyst of claim 1, wherein a ratio of platinum contained in the metal fine particles is 80 atomic % or higher.

6. The supported metal catalyst of claim 1, wherein the metal fine particles have a crystallite diameter of 2 to 10 nm, the crystallite diameter determined from a XRD pattern.

7. The supported metal catalyst of claim 1, wherein:
a metal of the metal oxide structuring the support fine particles contains tin; and
a value of a ratio of {Sn metal peak intensity/$SnO_2$ peak intensity} in a XPS spectrum is 15% or less.

8. A supported metal catalyst, comprising:

a support powder, and metal fine particles supported on the support powder; wherein:

the support powder is an aggregate of support fine particles;

the support fine particles have a chained portion structured by a plurality of crystallites being fusion-bonded to form a chain;

the support fine particles are structured with a metal oxide;

a supported amount of the metal fine particles per unit area of a surface area of the support powder calculated based on a BET specific surface area is 10.5 to 27.0 ($mg/m^2$); and a value of I1/I2 is equal to or greater than 2.2, where I1 represents a peak intensity of (111) plane in a XRD pattern of the metal fine particles, and I2 represents a peak intensity of (200) plane in the XRD pattern of the metal fine particles.

9. The supported metal catalyst of claim 8, wherein a ratio of the metal fine particles to a total of the support powder and the metal fine particles is 20 to 50 mass %.

10. The supported metal catalyst of claim 8, wherein the value of I1/I2 is equal to or greater than 2.5.

11. The supported metal catalyst of claim 8, wherein an electric conductivity of the supported metal catalyst is 0.01 S/cm or higher.

12. The supported metal catalyst of claim 8, wherein a ratio of platinum contained in the metal fine particles is 80 atomic % or higher.

13. The supported metal catalyst of claim 8, wherein the metal fine particles have a crystallite diameter of 2 to 10 nm, the crystallite diameter determined from a XRD pattern.

14. The supported metal catalyst of claim 8, wherein:

a metal of the metal oxide structuring the support fine particles contains tin; and a value of a ratio of {Sn metal peak intensity/$SnO_2$ peak intensity} in a XPS spectrum is 15% or less.

15. A supported metal catalyst, comprising:

a support powder, and metal fine particles supported on the support powder; wherein:

the support powder is an aggregate of support fine particles;

the support fine particles have a chained portion structured by a plurality of crystallites being fusion-bonded to form a chain;

the support fine particles are structured with a metal oxide;

a ratio of the metal fine particles to a total of the support powder and the metal fine particles is 28 to 50 mass %; and a value of I1/I2 is equal to or greater than 2.2, where I1 represents a peak intensity of (111) plane in a XRD pattern of the metal fine particles, and I2 represents a peak intensity of (200) plane in the XRD pattern of the metal fine particles.

16. The supported metal catalyst of claim 15, wherein the value of I1/I2 is equal to or greater than 2.5.

17. The supported metal catalyst of claim 15, wherein an electric conductivity of the supported metal catalyst is 0.01 S/cm or higher.

18. The supported metal catalyst of claim 15, wherein a ratio of platinum contained in the metal fine particles is 80 atomic % or higher.

19. The supported metal catalyst of claim 15, wherein the metal fine particles have a crystallite diameter of 2 to 10 nm, the crystallite diameter determined from a XRD pattern.

20. The supported metal catalyst of claim 15, wherein:

a metal of the metal oxide structuring the support fine particles contains tin; and a value of a ratio of {Sn metal peak intensity/$SnO_2$ peak intensity} in a XPS spectrum is 15% or less.

* * * * *